United States Patent
Zanchetta et al.

(10) Patent No.: US 7,132,143 B2
(45) Date of Patent: *Nov. 7, 2006

(54) SELF-ADHERING MODIFIED BITUMEN UNDERLAYMENT FOR TILE ROOFS

(75) Inventors: Natalino Zanchetta, Reno, NV (US); Shaik Mohseen, Mountain Top, PA (US)

(73) Assignee: Polyglass U.S.A. Inc., Hazleton, PA (US)

( * ) Notice: Subject to any disclaimer, the term of this patent is extended or adjusted under 35 U.S.C. 154(b) by 17 days.

This patent is subject to a terminal disclaimer.

(21) Appl. No.: 10/776,863

(22) Filed: Feb. 11, 2004

(65) Prior Publication Data

US 2004/0161569 A1    Aug. 19, 2004

(51) Int. Cl.
   *B32B 11/04* (2006.01)
(52) U.S. Cl. .................. 428/40.1; 52/177; 52/181; 428/40.2; 428/40.3; 428/41.5; 428/141; 428/143; 428/147; 428/354
(58) Field of Classification Search ............... 428/40.1, 428/40.2, 40.3, 41.5, 141, 143, 147, 354; 52/177, 181
   See application file for complete search history.

(56) References Cited

U.S. PATENT DOCUMENTS 4,992,315 A * 2/1991 Zickell et al. ............. 428/40.3
5,686,703 A * 11/1997 Yamaguchi ................. 174/259
5,916,654 A * 6/1999 Phillips et al. ............. 428/42.2
6,284,820 B1 * 9/2001 Braga et al. .................. 524/70
6,641,896 B1 * 11/2003 Fensel et al. ................ 428/141
6,696,125 B1 * 2/2004 Zanchetta et al. ......... 428/40.1

* cited by examiner

Primary Examiner—Nasser Ahmad
(74) Attorney, Agent, or Firm—David I. Roche; Baker & McKenzie LLP

(57) ABSTRACT

A self-adhering modified bituminous roofing tile underlayment material for tile roof assemblies that comprises an APP modified bitumen compound on the front side, and a factory-applied self-adhesive compound on the back side of a reinforcement carrier sheet, and granules embedded on the APP modified bitumen compound to provide a non-skid surface. A method of manufacturing such composite comprising coating an APP compound on the top surface and affixing a self-adhesive compound to the bottom surface of a reinforcement carrier support sheet, and applying a release liner to the tacky self-adhesive layer during manufacture, stripping the release liner, salvage release film and end lap film from the membrane immediately prior to use, subsequently placing the surface of the membrane directly on to the upper surface of the roof deck, base sheet or underlayment, and applying force directly to the sheet to enhance the bond between the composite and the underlying surface that is created by the tacky self-adhesive compound. The present invention relates generally to roofing underlayments residential roofing assemblies using tiles made of clay or concrete as the exposed surface.

37 Claims, 2 Drawing Sheets

SELF-ADHERING MODIFIED BITUMEN UNDERLAYMENT FOR TILE ROOFS

RELATED APPLICATION

This application claims the benefit of a previously filed patent application entitled "Self-Adhered Modified Bitumen Roofing Material" filed on Apr. 25, 2002 and assigned Ser. No. 10/131,842, now U.S. Pat. No. 6,696,125.

BACKGROUND AND SUMMARY OF THE INVENTION

This invention relates to bituminous roofing adapted for the waterproofing and sealing of substrate structures and to the method of manufacturing such materials. More particularly, the present invention is in the field of roofing membranes used as underlayment, which may optionally have a factory-applied self-adhesive layer on the bottom surface and a thermoplastic modifier such as Atactic Polypropylene (APP) modified bituminous compound on the top surface in order to provide easy and problem-free field application by roofing personnel.

It is well known to use bituminous compositions for manufacturing waterproofing membranes, generally for roof covering and roofing underlayments. Modified bituminous prepared roofing, also referred to as modified asphalt roofing membrane, is typically manufactured using, as a core, a reinforcement carrier support sheet made of fabric such as polyester, fiberglass, or a combination of both, saturating and coating the front and back sides of the carrier with a modified bituminous coating material based on Atactic Polypropylene (APP), Amorphous Poly Alpha Olefin (APAO), Thermoplastic Polyolefin (TPO), Styrene-Butadiene-Styrene (SBS), Styrene-Ethylene-Butadiene-Styrene (SEBS), synthetic rubber or other asphaltic modifiers, that will enhance the properties of asphalt.

Roofing membranes are used in commercial, industrial and residential applications. Two major classifications of modified bitumen roofing materials, which are used mostly in industrial and commercial applications are (1) cap sheet and (2) base sheet. Shingle roofing materials, however, are used primarily in residential applications, and are exposed to the elements, and hence can be considered as 'cap' as well. A cap sheet or shingle membrane can be modified using Atactic Polypropylene (APP), Amorphous Poly Alpha Olefin (APAO), Thermoplastic Polyolefin (TPO), Styrene-Butadiene-Styrene (SBS), Styrene-Ethylene-Butadiene-Styrene (SEBS), synthetic rubber or other asphaltic modifiers, and is generally reinforced with a polyester carrier or a combination of polyester and fiberglass. These sheets can be smooth or granular surfaced and are typically greater than 2.8 mm in thickness. The top surface of the cap sheet is exposed to the elements and hence the name "cap".

A base sheet is typically modified using any of the same modifiers as a cap sheet, but due to economic considerations, is modified using smaller quantities of less expensive polymers such as Atactic Polypropylene (APP) or Styrene-Butadiene-Styrene (SBS). A base sheet is generally reinforced with a fiberglass carrier (which costs significantly lower than polyester) and is smooth surfaced. The thickness of such base sheet typically ranges from 1.0 mm to 2.5 mm depending upon the job specifications. In a typical field installation, a base sheet is first applied to the roof deck using mechanical fasteners, via hot mopping or using cold application techniques.

Cap sheets or shingles are applied on top of the base sheets, with the seams of adjacent rolls in offset relation. Most APP-modified bitumen membranes are torch-applied, i.e., by heating the back side of the sheet to melt the compound and using the molten compound to form a heat weld. Most SBS-modified bitumen membranes are set during in-field application in hot mopping asphalt, torch-applied or adhered with cold-process adhesives, as described in U.S. Pat. No. 5,807,911 issued to Wentz, et al., on Sep. 1, 1992. Modified bitumen membranes which do not have factory-applied granule or foil surfacing need some form of field-applied ultraviolet protective coating.

Of the two general types of bituminous sheet materials used for roofing applications, i.e., bitumen-SBS and bitumen-APP materials, the bitumen-SBS products are more elastic, with greater flexibility at low temperatures. APP-based products, however, are more heat-resistant (due to a higher softening point), are more resistant against the effects of the atmosphere (especially ultra-violet rays) and more resistant to foot traffic.

The manufacture of bituminous roofing material with multiple layers is well known. For example, U.S. Pat. Nos. 2,893,889; 4,755,409; 4,871,605; and EP Patent No. 903435 disclose membranes comprised of a core and a plurality of different layers of waterproofing material. The '409 patent also discloses a release sheet applied to the one side of the membrane for purposes of protection. Products are in the market, which combine the more flexible and elastic bitumen-SBS upper layer with a self-adhesive lower surface. An example of such a product is Plura AD self-adhesive sold by Pluvitec S.p.A., described on the website of the seller at http://www.pluvitec.com. Application of a primer is recommended when using this material in order to ensure adherence of the self-adhesive layer to a substrate, and the use of added heat, i.e., by a torch, is also recommended.

Roofing underlayment materials are used in roofing systems such as modified bituminous roofing membranes as well as shingles, tiles, slates, cedar and metal roofing. Some underlayments such as asbestos fiber roofing felts were used during the early part of the 20$^{th}$ century but are no longer used due to health hazards associated with asbestos fibers. The most commonly used underlayment is asphalt-saturated roofing felt, commonly known as No. 15, No. 30 or No. 50 felt. These have been in use for a very long time and are the least expensive form of underlayment available. Roofing felt is made from a base sheet made of paper coated with filler-modified asphalt and as such is very inexpensive. Several roofing companies produce such materials. The main objective of using felt is to provide a protective barrier on the deck when applying roofing membranes by means of hop mopping, torching or self-adhesive applications. Several building code bodies such as Miami Metro Dade County authority dictates the use of slip sheet in all roofing applications under its jurisdiction. This is to ensure that the roof deck such as plywood is not damaged during 'roof tear off' when replacing the roof.

Roofing felts have been in short supply periodically and due to supply-demand factors, the price of felt has continued to rise over the years. Interestingly, felts have several limitations. It is well known that roofs undergo significant expansion and contraction as they heat and cool throughout the day. Because of such thermal cycling, felts experience shrinkage when exposed to the elements and exhibit deterioration in a relatively short period of time. Moreover felts are not watertight when roofing nails or staples are driven through them, making it necessary to cover the felt underlayment with the next course of roofing material immediately upon installation of the felt to the deck. These limitations, coupled with frequent shortage of felt underlayments, have forced roofers and contractors to search for alternate materials.

Sheets which are sold as membranes in roll form are sometimes cut into smaller sections to form shingles for use on roofs with greater slope. Shingles are typically nailed into place, and are most commonly used in residential roofing.

Another category of roofing membranes are "underlayments", which are widely used in residential applications, and may also be designed for use in regions with colder climates, where ice-dam protection is required. Underlayments, commonly utilized under shingle roofing material, metal roofing panels or tile roofing, provide waterproofing characteristics and are typically reinforced with fiberglass. However, there are a few products in the market place that have no carrier such that these consist of simply a coating of self-adhesive compound on a polyolefinic film. Polystick P made by Polyglass USA, Grace Ice & Water Shield and Grace Vycor Ultra manufactured by W. R. Grace & Company are examples of such materials. These non-carrier based underlayments are typically very soft and are ideally suited for use in areas of roofs such as perimeters, hips, valleys, etc. where ice darn formation may occur during winter. Underlayments are typically used in steep slope roofing applications and, therefore, it is preferable that they provide good traction for the safety of the roofer installing the material. A typical underlayment installation involves mechanically fastening the same to the plywood substrate or adhering the underlayment to the plywood substrate using an adhesive compound.

Most underlayment materials designed to be used under metal roofing are based on SBS. Upon installation of such underlayment, metallic panels may be mechanically fastened to the top of the roofing underlayment. It is essential to note that metal generates substantial excess heat and therefore necessitates the use of a self-adhering underlayment that can withstand high temperature. Also granular surfaced products, whether APP or SBS based, are not recommended since the mineral surface can cause abrasion of the metal. This poses severe problems for the installer of such roofing underlayments in that these products are generally modified with styrene-butadiene-styrene (SBS) compound, which is soft and flows at temperatures above 110 degrees Celsius. Hence it is necessary to develop a product that has high heat resistance and a non-abrasive surface on the exposed side.

Upon installation of the underlayment, in the case of tile roofing, corresponding tiles that may be made of clay or concrete, are loaded to the top of the roofing underlayment. This poses several problems for the installer of the roof in that underlayments are generally thin (less than 2 mm in thickness), smooth surfaced, modified with SBS compound which is soft, and are reinforced with a fiberglass sheet that imparts very poor tear resistance properties to the membrane. Especially when the slope of the roof, commonly referred to as roof pitch, is steep, tiles that are stacked on top of the roof and can weigh from 80 to 100 lbs. per square foot of area, depending upon the type of tiles and the height of stacking, begin to slide down the roof and eventually fall on the ground. Obviously this poses a great risk to people working on the roof and in the vicinity of the same, in addition to damage caused to the underlayment material, and lost installation time. Consequently, there is a need for a material that is very easy to install as well as durable enough to offer high temperature resistance and resistance to tile slippage. There is also a need for a tile underlayment that is tough enough and that connects well to the roof substructure to withstand and work effectively with the attachment of tiles to the underlayment by any of several methods, such as mechanical fastening and the use of adhesives such as foam adhesives.

One object of the present invention is to provide a sheet that permits easy installation by means of a factory-applied, properly placed, self-adhesive compound applied to the membrane under controlled conditions prior to use in the field. This also allows enhanced adhesion of the tacky self-adhesive to the roof deck because the self-adhesive compound is applied in the factory under controlled conditions rather than in the field where contamination and variation in application techniques are considerably more of a problem.

Base sheets, cap sheets and underlayments are applied to the underlying surface using a variety of methods such as using mechanical fasteners, which is a slow and cumbersome process. During installation of a roof, roofing underlayments are attached to the wood deck by 'mechanically fastening' using roofing nails or staples. Based on the roof specifications, another course of material such as No. 90 felt is applied on top of the No. 15 or No. 30 felt, usually via hot asphalt mopping. Tiles or shingles are attached to the upper surface of the exposed membrane via mechanical attachments or using foam adhesive such as Polyurethane. In the former method, tiles are fastened or mechanically attached to the surface of the inventive tile underlayment using roofing nails. In the latter method, Polyurethane foam is sprayed on the top surface and roofing tiles are 'set' on the foam adhesive.

One method of application is referred to as "torching", in which the back surface of the rolls are heated. Heating of the bitumen-based roofing membranes is typically carried out by use of propane gas burners or torches. When the flame, which has a typical temperature of 1,000 to 1,300 degrees Celsius is directed towards the bottom surface of the sheet, APP compound from the bottom surface reaches a molten state and starts to flow on to the substrate and then cools to form a waterproofing bond. It is obvious that torching is dangerous considering the risk of fire caused by the utilization of a torch and other similar equipment.

Similarly, hot mopping, in which drums or cartons of hot asphalt are used, although poses a reduced risk of fire versus torch application, still poses an operational problem. Hot-mopping application, which requires a fair amount of labor, especially in larger projects, also results in waste cartons with chemical residue. These dirty cartons must be disposed of properly, for example, in landfills, and may become unsafe for the environment. In addition, disposal of the waste materials become costly and labor-intensive. Alternatively, hot asphalt is directly pumped to the roof from the ground using a hose. Whereas this method eliminates the aforementioned problems associated with disposal of cartons, etc., it poses other problems in that it is very difficult and dangerous to pump hot asphalt to the roof level, especially in the case of high-rise buildings.

Another way of connecting membranes to sub-roofing is by using cold adhesives, which generally come in buckets or pressurized spray can systems. Use of cold adhesive poses its own problems related to disposal of empty buckets or aerosol cans. Additionally, cold adhesives contain solvents that are not desirable from an environmental point of view. For example, they produce VOC (volatile organic compound) and emissions that are harmful to the environment and to people. Moreover, there is a potential for the release of airborne pollutants with this system of application.

Furthermore, the end result of the above-described in field applications is also not successful each and every time. Several of these modified bitumen compositions are known. However, these products are based on application methods that pose environmental and operational hazards during the application of the roofing membrane. There is, therefore, a need to provide a modified bitumen roofing membrane which reduces labor and installation costs, provides good bonding properties at high and low temperatures, reduces VOCs and emissions from hot mopped or torched in-field roofing membrane applications. The present invention permits a more simplified, safer and economical roof installation without compromising structural integrity and lap sealing capabilities. It also offers a suitable means to dramatically reduce field labor by offering a 'dual compound' product, which eliminates the numerous undesirable aspects of the prior art.

During installation of the underlayment, in the case of tile roofing, corresponding tiles that may be made of clay or concrete are loaded to the top of the roofing underlayment. This poses several problems for the installer of the roof in that underlayments are generally thin (less than 2 mm in thickness), smooth surfaced, modified with filler alone or with an SBS compound which is soft, and are reinforced with a fiberglass sheet that imparts very poor tear resistance properties to the membrane. Especially when the slope of the roof, commonly referred to as roof pitch, is steep, tiles that are stacked on top of the roof and can weigh from 80 to 100 lbs. per square foot of area, depending upon the type of tiles and the height of stacking, begin to slide down the roof and eventually fall on the ground. Obviously this poses a great risk to people working on the roof and in the vicinity of the same, in addition to damage caused to the underlayment material, and lost installation time. Therefore an important factor to take into consideration before selecting roofing underlayments is that these materials are usually used in steep slope roofing applications and, therefore, must provide good traction for the safety of the roofer installing the material. Consequently, there is a need for a material that is very easy to install as well as durable enough to offer high temperature resistance and resistance to tile slippage. Such material must also be economical, thereby making use of commercial roofing membranes as underlayment materials cost prohibitive.

The inventions described herein deal with roofing tile underlayment sheet based on dual compound technology whereby a harder and tougher layer of modified bituminous compound is used to form the top surface of the membrane and a self-adhesive compound is used to form the bottom layer of the membrane. Both the top and bottom layer are carried by a reinforcing material that lies between the top and bottom layers. This dual compound technology allows enhanced adhesion of the tacky self-adhesive material to the roof deck because the self-adhesive compound is applied in the factory under controlled conditions rather than in the field where contamination and variation in application techniques are considerably more of a problem.

This membranes described herein are "dual compound" in that different top and bottom materials are carried by the reinforcement carrier sheet—for example, a compound based on Atactic Polypropylene (APP) or Amorphous Poly Alpha Olefin (APAO) or Thermoplastic Polyolefin (TPO) on the top surface, and a separate heat-and-pressure-activated adhesive compound to the bottom surface of the reinforcement carrier sheet. One object of the present invention is to provide a 'dual compound' self-adhered cap sheet, with APP compound on the weathering surface and a self-adhesive compound on the back surface. Such membranes are ideal for regions where SBS based membranes (torch, mop, cold applied or self-adhered) are unsuitable due to high temperature conditions, and APP torch membranes are undesirable due to legislative restrictions on use of torch or prohibitive insurance costs.

Yet another object of the present invention is to provide membranes with well-embedded, non-abrasive, high temperature resistant and tough fabric surface that is highly durable.

It is still another object of the present invention to provide a unique APP modified bitumen compound on the top surface that is very "hard". When metal panels heat up during the daytime, especially in summer, heat is transferred to the underlayment below. This transfer of heat softens the modified compound, more profoundly in the case of SBS, which has been the preferred modifier in most existing underlayments. However, SBS compounds become softer when heated to relatively lower temperatures than other compounds, and can cause the SBS compounds to flow. Use of a hard APP compound alleviates this problem. Typical softening point temperatures of APP modified compound is in excess of 150 degrees Celsius, whereas that of conventional SBS modified compound is approximately 120 degrees Celsius.

Yet another object of the present invention is to provide membranes with well-embedded mineral granular surface that is coarse enough to resist any movement of the tiles in a downward fashion by offering a non-skid surface.

When roofing tiles begin to move, they first "sink" into the soft SBS compound used in most existing underlayments, causing damage to the fiberglass reinforcement. The softening of SBS compounds at lower temperatures can result in the tiles sliding downward, particularly on steeper sloped roofs. Use of a hard APP compound makes it less likely that the tiles will "sink" into the compound. Thus, the use of APP compounds helps to prevent damage to the fiberglass mat used as support.

Yet another object of the present invention is to provide APP modified bituminous, self-adhesive shingles, referred to as modified shingles, reinforced with a combination of polyester and fiberglass reinforcements.

Shingles, commonly employed in residential applications and typically manufactured using filler modified asphalt and fiberglass support, are applied to the roof deck using nails. However APP modified and SBS modified shingles exist in the market. A feature of the membranes described herein is that the membrane can be cut into shingles that will have "dual compound" structure—APP modified compound on the top surface and self-adhesive compound on the bottom surface. Such shingles are reinforced with a dual carrier—polyester and fiberglass—to impart the best characteristics of both reinforcements to the shingles.

APP modified bitumen compound by itself does not possess any adhesive properties to directly adhere to any substrate. Similarly, self-adhesive compounds have "very poor" weathering characteristics, thereby undergoing premature degradation with exposure to the elements. Dual compound combines the best of an APP and a self-adhesive compound. The advantage of a "dual" compound is the ability to add a "true" roofing compound such as an APP modified bitumen on the top (weathering) surface and a self-adhesive compound on the bottom surface. The thickness of such cap membranes is between 1.0 mm and 5.0 mm. Typical weight of a one square roll (1 roofing square equals 107.6 square feet) is between 60 pounds and 115 pounds, depending upon thickness of the membrane. Such membranes may be reinforced with a polyester, fiberglass or polyester/fiberglass combination mat. Generally, fiberglass is used as a carrier in tile underlayment sheets due to their low cost.

A release liner, typically made of polypropylene, polyethylene or polyester, of thickness ranging from 40 to 80 microns, and treated with a silicone adhesive on one side (the side that comes in contact with compound), is applied to the self-adhesive compound to prevent sticking of adjacent sections of the roofing material and to the packaging when the finished membrane is stored and transported in the form of rolls.

The present invention involves roof coverings in the form of roofing membranes, including shingles, having a top layer of an APP modified bituminous compound, whose composition utilizes bitumen (asphalt), APP plastomeric modifiers and fillers, and a bottom layer of a self-adhesive compound, whose composition utilizes bitumen (asphalt), elastomeric modifiers, tackifying resins, and fillers. A typical APP compound may contain 5% to 25% of polypropylene modifiers, 8% to 70% of filler such as limestone or talc, and remaining portions of asphalt. In order to achieve fire ratings as classified by Underwriters' Laboratories (UL), special fire retardant additives may be used as filler. A typical self-adhesive compound may contain 3% to 10% of Styrene-butadiene-styrene modifiers, 0% to 5% of Styrene-isoprene-styrene modifiers, 6% to 25% of hydrocarbon tackifying resins, 8% to 40% of filler such as limestone, talc, fly ash, volcanic ash, graphite, carbon black, silica or china clay, and remaining portions of asphalt.

The inventive membrane has a carrier that supports a dual compound modified asphalt, namely, an APP modified asphaltic compound which is positioned on top of the carrier sheet, and a self-adhesive modified asphaltic compound which is positioned below the carrier sheet. The adherent material serves to affix the membrane to the roof deck (in the case of an underlayment), to the base sheet or underlayment (in the case of a cap sheet).

In order to provide adhesion and a watertight seal between the roofing membrane and either the base sheet, underlayment or the roof deck, a self-adhesive compound that is compatible with the modified bituminous coating layer must be utilized. The factory-applied self-adhesive compound provides an adhesive layer to the roofing membrane having sufficient surface tack ("quick grab"), as well as adequate strength for use in adhering roofing sheet membranes to the roof deck, underlayment or base sheet.

Furthermore, when applying the present invention to underlayments, surfacing agents can be applied to the upper surface of the roofing membrane. In the case of metal roofing underlayments, a suitable surfacing agent such as polyester or polypropylene fabric, of thickness 0.05 mm to 0.15 mm and of unit weight 20 to 60 grams per square meter, can be applied to the weathering surface of the roofing membrane to provide high temperature resistance. Polyester and polypropylene materials have higher softening point and, therefore are less susceptible to heat than polyethylene; hence the selection of these fabrics for this invention.

Similarly, in the case of tile roofing underlayments, a suitable surfacing agent such as mineral granules can be applied to the weathering surface of the roofing membrane to provide slip resistance. When selecting granules for this application, it is critical to note that the granule size must not be too small so as not to provide the required slip resistance and not too big to pose a problem in manufacturing. Typical granule screen grading are as follows: 40% to 55% by weight passing U.S. standard sieve #16, 15% to 45% by weight passing U.S. standard sieve #20. Whereas the color of the granules does not affect slip resistance, lighter color granules possess higher reflectivity and thereby maintain the underlayment surface cooler. Tile underlayments surfaced with darker color granules absorb more heat and hence the APP compound gets softer leading to sliding of tiles stacked on the top. It is therefore preferable to use lighter color granules for tile underlayment applications.

Another suitable surfacing agent that can be applied to the upper surface of a sheet of the present invention when it is to be used as an underlayment for tile roofs is film material. Such film material must have treatment on the exposed surface to achieve non-skid properties. If the top surface is too smooth, it may not provide the necessary skid resistance for the installer of the product. Hence it is essential to provide a non-skid treatment on the exposed side. Such film must also exhibit high temperature resistance and resistance to the harmful effects of sun's ultraviolet rays. Polyolefinic films are used in a variety of applications including roofing membranes, food packaging, grocery bags, etc. and are usually made of polypropylene or polyethylene. PCL Packaging of Massachusetts, Sipa of Italy, and Cartenplast of Italy are sources of such films. During manufacture of these films, anti-skid additives can be incorporated to aid in providing skid resistance properties. When selecting film for laminating to the upper side of the modified bituminous compound, it is critical to note that the film must not be too thick that it may not get sufficiently embedded in the modified bituminous compound. For the manufacture of the inventive metal underlayment material, film based on polyethylene is chosen. Further high density polyethylene (HDPE) is preferred for this application. Polyethylene films are readily available and are economical. HDPE film selected for this lamination was of thickness ranging from 2 mil (50 microns) to 4 mil (100 microns) in order to facilitate ease of lamination to the modified bituminous compound. However the preferred thickness is 2.8 mil (70 micron). Whereas the color of the film does not affect skid resistance, lighter color fabrics possess higher reflectivity and thereby maintain the underlayment surface cooler. Metal underlayments surfaced with darker colored fabrics absorb more heat and hence the modified bituminous compound gets softer. It is therefore preferable to use lighter color films for metal underlayment applications. The HDPE film of the present invention is treated with an anti-skid coating on the upper surface. Such coating is usually in the form of straight lines or a geometric pattern and consists of adhesives such as Ethyl Vinyl Acetate (EVA), Amorphous Poly Alpha Olefin (APAO), PolyAmide or Pressure Sensitive Adhesives (PSA). For this invention, an EVA adhesive called Jowatherm Hot Melt Adhesive from Jowat Corporation, North Carolina was chosen.

Non-woven fabrics have low strength, and as such may be unable to resist movement of tiles on rooftops. Whereas non-woven polypropylene fabric may be used as the top layer in laminate in the case of metal underlayment, a stitch-bonded polypropylene fabric is the preferred choice for the top layer of the laminate for the underlayment when it will be employed as a roofing tile underlayment. Stitch-bonded polypropylene is lightweight as well but possesses very high tear strength due to its process of manufacture and unique construction. Tie-Tex International of South Carolina is a leading manufacturer of such material. When underlayment of the present invention is manufactured using stitch-bonded polypropylene on the upper surface, the resultant material is well suited for use as a roofing tile underlayment.

DETAILED DESCRIPTION

In one preferred embodiment, the modified bitumen membrane is a dual compound composition constructed of a first APP modified asphaltic layer on the front side of the carrier sheet and a second self-adhesive asphaltic layer on the back side of the carrier sheet. The second asphaltic layer is very adherent and provides excellent adhesion of the membrane to the underlying surface.

Figure 1:
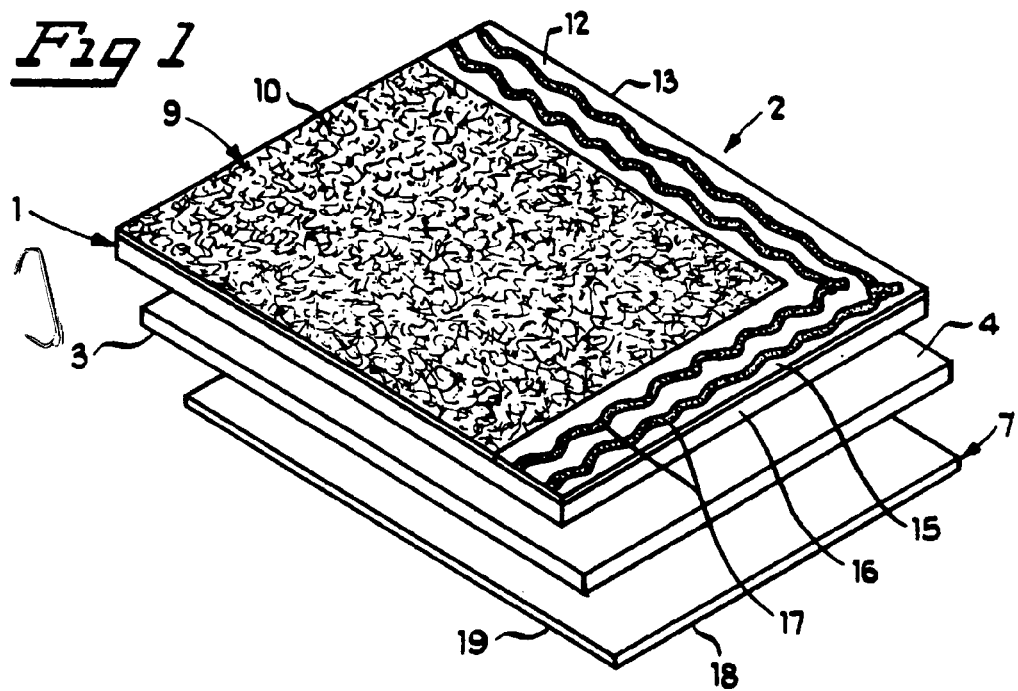
FIG. 1 is an exploded view of the roofing membrane composite sheet.

Referring now to the drawings, FIG. 1 represents a bituminous self-adhesive membrane constructed in accordance with the present invention and is shown in an exploded view. The composite sheet 2 is made with modified asphalt coatings and a reinforcing carrier sheet 4. Specifically, composite sheet 2 includes a reinforcing carrier 4 sandwiched between top and bottom layers, 1 and 7, respectively, of modified bitumen coatings, which form oppositely upper and lower surfaces, 9 and 18, respectively, of the composite sheet 2. The bottom layer 7 has an adhesive polymer-modified compound that constitutes a non-weathering surface adapted to be secured to the underlying surface. The top layer 1 is an APP compound (described in detail later in the description) and the bottom layer 7 is a separate, but compatible, self-adhesive compound (also described in detail later in the description). Between the top and bottom layers, 1 and 7 respectively, is a reinforcing carrier sheet core 4, preferably made of a fiberglass or polyester substrate. Alternatively, the reinforcing carrier sheet 4 may be formed of a composite material that is a combination of both polyester and fiberglass creating a stronger reinforcement carrier sheet 4. As will become hereinafter apparent, the lower surface 18 of the bottom layer 7 is a non-weathering surface adapted to be adhered directly to the underlying surface. Surfacing agents 10, such as granules, talc or sand for cap sheets and base sheets, fabric surfacing for metal underlayments or mineral granules or stitch-bonded fabric (e.g. Tie-Tex or Tie-Tex-like material) for tile underlayments, are applied to the upper surface of the top asphaltic coating layer 1 to impart weathering properties as well as, high temperature resistant characteristics and skid resistant characteristics. In addition, some high performance films with high toughness and surface features (e.g. embossing) that provide resistance to sliding of tiles are suitable top surface layers for tile underlayment.

Positioned on the lower surface 18 of the bottom adhesive asphaltic layer 7 is a release liner 19 of preferably silicone treated polypropylene, polyethylene or polyester release liner 19. Of course, during application to the underlying surface or roof deck, the release liner 19 is removed, thereby allowing the sticky lower surface of the composite to adhere to the roof. The top APP compound layer 1 of the composite sheet 2 can either be smooth surfaced or surfaced with a protective layer of surfacing agents 10, such as granules, as shown in FIG. 1. This upper surface 9 constitutes a surface exposed to weather conditions or possibly to other membranes or shingles.

The top APP compound layer 1 of the present invention is characterized in that it comprises a mixture consisting of the following: 5% to 25% of a mixture of polypropylene modifiers comprising of (a) isotactic polypropylene; (b) ethylene-propylene copolymer; (c) atactic polypropylene, and (d) polyethylene, preferably film grade material, 8% to 70% of filler such as limestone, talc, fly ash, volcanic ash, graphite, carbon black, silica or china clay, and 45% to 75% of asphalt. Polyethylene used in the APP formulation can be high density polyethylene (HDPE) or low density polyethylene (LDPE), virgin or recycled material. APP formulations may be adjusted slightly to account for seasonal temperature fluctuations, such as, very hard compound to be used during summer months and a compound with medium hardness to be used during the winter months. In the place of APP, commercially available Thermoplastic Olefin (TPO) can be substituted as well. Such a mix should have a viscosity of 2,000 to 20,000 cPs at 180 degrees Celsius, a ring and ball softening point temperature greater than 130 degrees Celsius, and a needle penetration value of 65 dmm at 60 degrees Celsius for the dual compound cap sheet, and less than 50 dmm at 60 degrees Celsius for the tile underlayment and metal underlayment, with a preferred range of 40 to 140 dmm. All tests values are determined using appropriate ASTM test methods and standards. The APP compound can contain a tackifying resin in amounts ranging from 0% to 2% to improve adhesion at lap joints. Additionally, in order to achieve fire ratings as classified by Underwriters' Laboratories (UL), special fire retardant additives may be used as filler material. Typical fire retardants employed include calcium borate, magnesium borate, a mixture of antimony tri-oxide and deca bromo diphenyl oxide, etc. These are used as replacement for existing filler material such as limestone, talc, fly ash, volcanic ash, graphite, carbon black, silica or china clay or in conjunction with these filler materials. A minimum of 10% of the fire retardant material is required to achieve the desired performance during fire testing.

The bottom adhesive layer 7 of the dual-compound asphaltic coating is an aggressive adhesive layer that is applied on the backside 3 of the carrier sheet 4. The bottom adhesive layer 7 should possess a reasonable shelf life and excellent adhesion characteristics and have sufficient surface tack for rooftop installation but yet should not be too sticky that one cannot remove the release liner 19 at high temperatures. The bottom adhesive layer 7 generally comprises a mixture of the following ingredients: 3% to 10% of styrene-butadiene-styrene copolymer, 4% to 11% of styrene-isoprene-styrene copolymer, 20% to 33% of hydrocarbon tackifying resins, 0% to 15% of mineral stabilizers such as limestone or talc, and the balance being asphalt, having a needle penetration value of at least 140 dmm at 25 degrees Celsius using relevant ASTM test method. Preliminary results have revealed that the pre-applied adhesive membranes provided adhesion as good as resulted from field application using conventional application methods such as hot mopping or cold application. Such results demonstrate that self-adhering composite sheets of the present invention and the method thereof provide overall excellent adhesion between the composite sheets and the underlying surface as well as a less labor-intensive application means in addition to elimination of emission of VOCs as compared to the existing state of the art.

Furthermore, the addition of PolyVinyl Butyral (PVB) has proven to be the preferred component in the self-adhesive bottom layer 7. PVB, a specialty resin used in the automotive industry, possesses excellent adhesive properties and hence is used in applications requiring high tack characteristics. PVB is primarily used as an innerlayer between car windshield glass. Use of PVB helps reduce the possibility of shattering of glass in the case of accidents and also provides good sound dampening properties. Each year, millions of pounds of PVB are discarded after use. Monsanto is one company that has perfected a process of removing the car windshield glass so that they could preserve the PVB layer sandwiched between the glass layers. It was found that use of a certain proportion of this resin in the self-adhesive formulation greatly enhanced the adhesive properties and also resulted in significant cost reduction. Therefore, it was determined for the present invention that by using PVB in the compound of the self-adhesive bottom layer 7, PVB was an excellent ingredient in the formulation of the self-adhesive compound. Addition of PVB has proven to be highly beneficial from economical and performance standpoints.

In applying PVB to the compound mixture, it was determined that: 1) use of styrene-isoprene-styrene could be eliminated; 2) amounts of styrene-butadiene-styrene were reduced; and 3) filler was introduced in mix formulation. As seen in Table II below, the PVB significantly reduced the cost of the self-adhesive layer compound. A very important parameter for self-adhesive materials is their ability to bond to various substrates. An ASTM test method is used to determine the adhesion to plywood values. This test measures the bonding strength of the self-adhesive compound to substrates such as plywood. Reported as force per unit area, adhesion testing is conducted at room temperature ("RT") as well as at low temperatures such as 5 degrees Celsius ("C"). A standard ASTM peel test conducted on the PVB-added bottom adhesive layer 7, revealed significantly improved adhesion characteristics as seen in Table I below.

TABLE I

| PEEL TEST RESULTS | | |
|---|---|---|
| Adhesion to plywood at RT (lbs/ft) | 25 | 45 |
| Adhesion to plywood at 5 deg C. (lbs/ft) | 10 | 20 |

TABLE II

| | Formulation Without PVB (% by Weight) | | | | Formulation With PVB (% by Weight) | | | |
|---|---|---|---|---|---|---|---|---|
| | Preferred | | | | Preferred | | | |
| Ingredients | Membrane | Shingle | Min | Max | Membrane | Shingle | Min | Max |
| Asphalt | 63 | 63 | 57 | 69 | 72 | 72 | 67 | 77 |
| Filler | 0 | 0 | 0 | 0 | 11 | 11 | 8 | 40 |
| SBS | 5 | 5 | 3 | 10 | 5 | 5 | 3 | 10 |
| SIS | 6 | 6 | 4 | 11 | 0 | 0 | 0 | 5 |
| Tackifiers | 26 | 26 | 20 | 33 | 8 | 8 | 4 | 16 |
| PVB | 0 | 0 | 0 | 0 | 4 | 4 | 2 | 9 |
| Cost of mix per pound | $0.29/lb | | | | $0.14/lb | | | |

Clearly, the PVB addition to the mixture of the compound improved performance of the overall compound greatly and further reduced costs in significant amounts.

A release liner 19, as described below, can be adhered to the self-adhesive compound bottom layer 7 to protect the adhesive properties during production, transportation and storage of the composite sheets or membranes. The release liner 19 is typically a polyester, polypropylene or polyethylene film that is 40 to 70 micron in thickness and siliconized on the surface that contacts the self-adhesive compound bottom layer 7. Optionally, a siliconized kraft paper or a composite of paper and film can be adhered to the adhesive portion of the composite sheet 2. The release liner 19 is removed prior to use of the composite sheet 2 to allow the adhesive portion to be adhered to a roof surface or other underlying surface. It is preferred that the release liner 19 be of white color on the exposed side so as to reflect solar energy and thereby keep the adhesive bottom layer 7 relatively cool.

With the adhesive bottom layer 7 being pre-applied, all that is required at the jobsite is for the applicator to unroll the composite sheet and position it, fold one-half of the rolled out membrane back and strip away the release liner 19, place the now-exposed adhesive bottom layer 7 onto the roof, and then apply pressure which can be accomplished merely by rolling using a metal roller that is at least 80 lbs in weight, and finally, folding the other half and removing the release liner 19, and adhering this section to the underlying surface as stated above.

Figure 2:
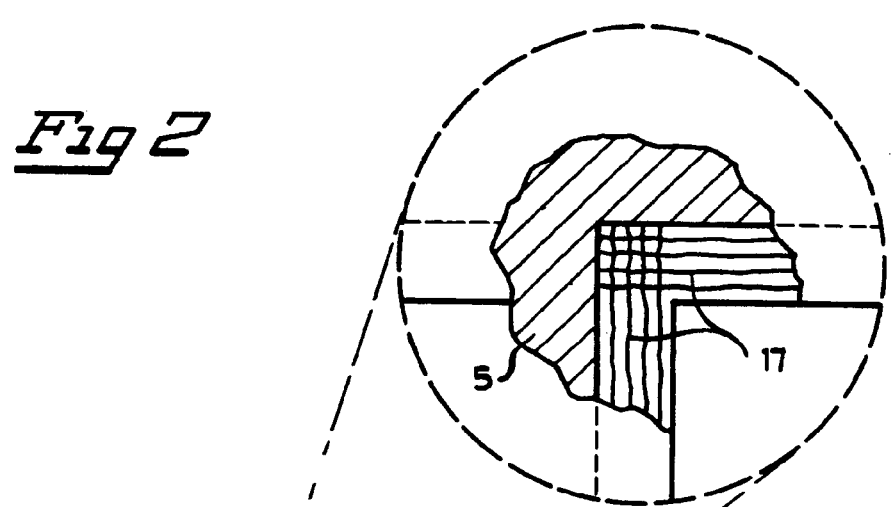
FIG. 2 is a top view of the composite sheet on a roofing substrate structure.
Figure 2:
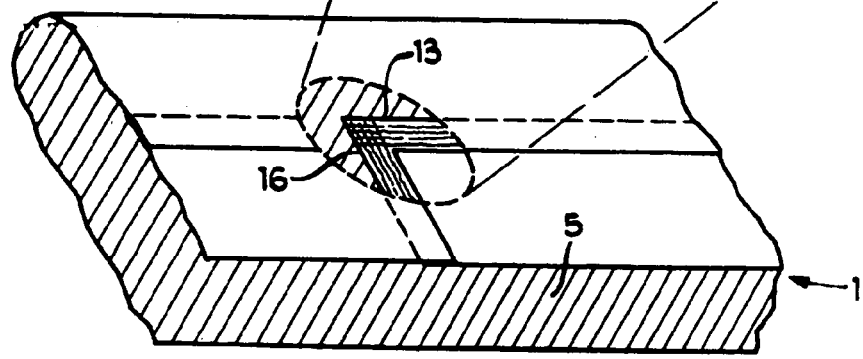

Referring now to FIG. 2, the composite sheet 2 is shown as applied to the underlying surface, which can be the roof deck itself or another base sheet or underlayment. The composite sheet 2 is shown with a cut-out exploded view illustrating the side lap 13 and the end lap 16. The side lap 13 runs longitudinally along one lengthwise edge of the composite sheet 2, whereas the end lap 16 runs widthwise along one end of the composite sheet 2. As illustrated, the composite sheet 2 is applied to the underlying surface 5 in successive rows. The composite sheet 2 can be adhered to each other along the side lap 13 and end lap 16 to create a watertight or connecting bond between successive or adjacent composite sheets 2.

Figure 3:
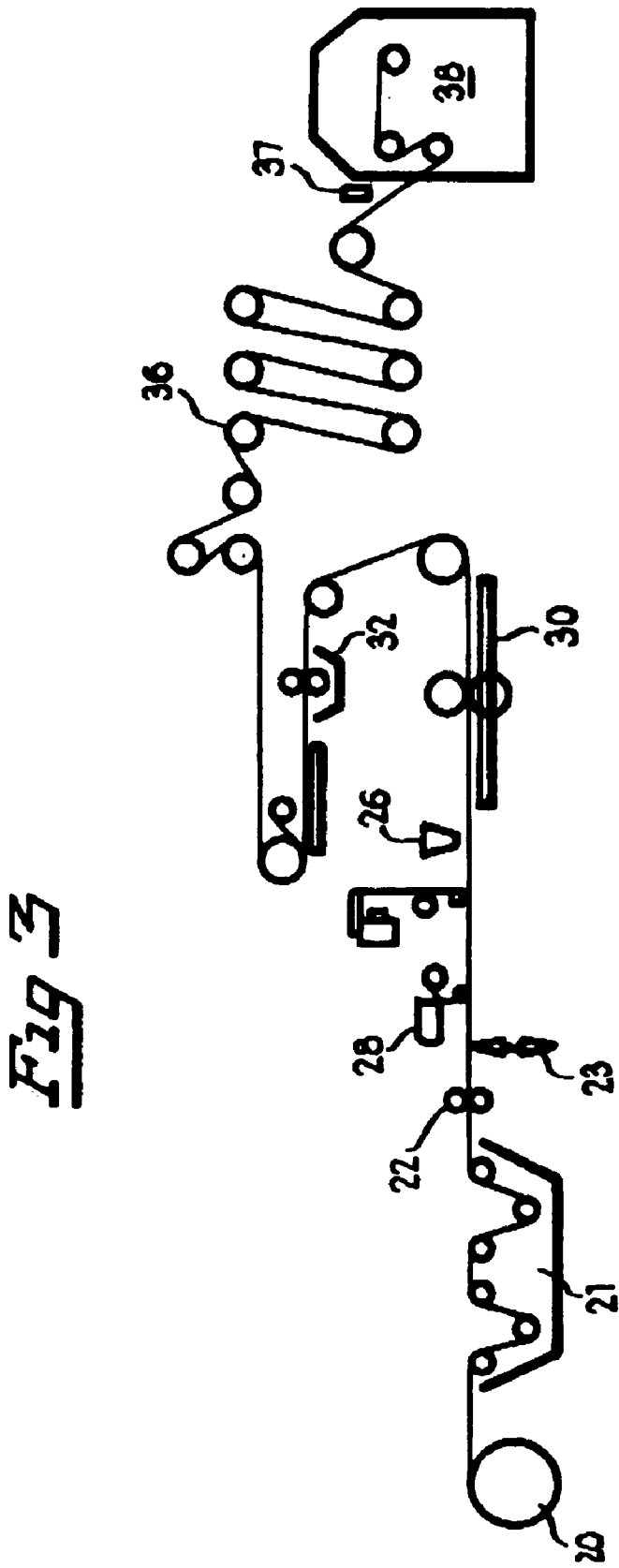
FIG. 3 is a view of the dual-compounding composite sheet manufacturing process.

FIG. 3 illustrates the process of manufacture of a dual compound modified bitumen composite sheet 2. One or more reinforcement carrier sheets 4, which may be polyester, fiberglass, or a polyester/fiberglass combination, is unwound from a mat unwinding station 20, and saturated with the APP modified bitumen compound top layer 1 in the saturation tank 21. Coating thickness is controlled using calender rolls 22 immediately after the saturated carrier sheet 4 comes out of the saturation tank 21. For this invention, compound from the carrier sheet back side 3 is scraped off using a scraper 23 in order to facilitate application of the self-adhesive compound bottom layer 7 on the carrier back side 3 of the carrier sheet 4 during a later stage in the manufacturing process. Directly following these applications, surfacing agentagents 10 (granules) isare applied using the surfacing applicator 26. After the surfacing application process, the composite sheet 2 undergoes cooling by traveling on a chilled water bath 30 and over cooling drums and typically is cooled to about 95 degrees Celsius. If granules are applied as surfacing agents 10, the roofing composite sheet 2 is continued through the production line over granular press rollers in order to embed the granules into the hot bituminous compound top layer 1. After traveling through a series of turns and gears, the composite sheet 2 is inverted such that the upper-exposed surface of the composite sheet 2 is now on the bottom side, and at about 160 degrees Celsius, the self-adhesive compound bottom layer 7 is applied at the coating vat 32. Following the self-adhesive bottom layer 7 application, the composite sheet 2 travels over a cooling belt to permit cooling of the self-adhesive compound. A release liner 19 is applied to the self-adhesive compound bottom layer 7 using the release liner applicator 34. Then, the composite sheet 2 travels through the accumulator 36 to the winder 37 where it is cut to the required length and wound into rolls. Alternatively, the composite sheet 2 can be cut into roofing shingles at the shingle cutter 38.

In another embodiment of the present invention, a siliconized polyester film, called salvage release film 12, that is approximately 3 to 4 inches in width, is placed along the length of the roll on one side of the composite sheet 2, forming a side lap 13. This allows for overlapping one roll over another widthwise.

Similarly, a siliconized polyester end lap film 1515, that is approximately 4 to 6 inches in width, is positioned across the width of the sheet at regular intervals to provide a granule-free end lap 16. For more detail on the end lap protection of a roll of roofing membrane see U.S. Pat. Nos. 5,843,522 and 5,766,729, which are assigned to the assignee of the inventions described herein and which are incorporated by reference herein. The protected end lap 16 feature allows a granule-free surface at the end of each roll and facilitates easy installation when overlapping one roll over another lengthwise.

Also removed at the time of roof covering installation are the salvage release film 12 and the end lap film 15.

It is well known that the lap joints are the weakest points on a continuous roof. Therefore, it is imperative that the bonding strength between adjacent rolls is very strong. In order to achieve maximum bonding strength between the APP compound and the self-adhesive compound at the contact areas for two adjacent rolls, namely, side laps 13 and end laps 16, it was found that use of a tackifying resin in small quantities in the APP compound formulation improved the surface tack of the APP compound and greatly enhanced lap bonding strength. Consequently, the APP compound can contain a tackifying resin in amounts ranging from 0% to 2%. Tackifying resins can be commercially available hydrocarbon based resins or PolyVinyl Butyral (PVB) discussed earlier.

It is well known that modified bitumen based roofing materials are used all over the country throughout the year. It is also known that the required bonding strength is achieved in products based on self-adhesive technology in the presence of heat and pressure, which act as catalyst to attain a permanent seal. However when these products are used during colder climatic conditions, the element of "heat" is lacking or insufficient. Whereas it is possible to recommend the use of a 'hot air gun' to activate the adhesive at the lap seams, it was found that addition of a thin layer or strips of tackifying resin or commercially available pressure-sensitive adhesive (PSA) or PolyVinyl Butyral (PVB) to the side lap and end lap, provided a good initial seal between adjacent rolls, before a strong, permanent lap bond can be achieved over time. This feature allows the application of such membranes under low temperature conditions, without compromising the integrity of the roof.

In another preferred embodiment, the carrier sheet comprises a polyester reinforcement in the case of APP modified self-adhesive cap sheet or a fiberglass reinforcement in the case of tile underlayment and metal underlayment. The membrane includes a first APP modified asphaltic coating portion and a second self-adhesive asphaltic coating portion. These two components may be present over a wide compositional range but a minimum thickness of 0.30 mm of the second coating portion is required to achieve the desired adhesion performance.

A siliconized polyester film tape, called salvage film, that is typically 3 to 4 inches in width, is applied on the salvage of the sheet using a salvage film applicator along the length of the sheet. In addition, for purposes of forming an end lap, a siliconized polyester tape, which is typically 4 to 6 inches in width, is applied across the sheet every 10 meters using an applicator device.

It is preferable that the tile underlayment of the present invention has a thickness of 2.5 mm and a unit weight of 70 lbs/100 square feet. Preferably, the metal underlayment will also have the following: minimum tensile strength of 25 lbs in the longitudinal and transversal directions when tested according to ASTM D2523, minimum elongation to break of 5% in the longitudinal and transversal directions when tested according to ASTM D2523, minimum tear strength of 20 lbs when tested according to ASTM D4533 and pass nail sealability test when tested according to ASTM D1970.

While specific embodiments of the inventions claimed below have been shown and described herein, it should be recognized that numerous alternatives, modifications, and variations of the embodiments shown and described may be readily made by persons of ordinary skill in the arts to which the inventions pertain, and such persons may devise a number of such alternatives, modifications, and variations of the embodiments shown and described herein without departing from the spirit and scope of the appended claims.

What is claimed is:

1. A self-adhering underlayment for tile roofing assemblies comprising:
    a dual-compound composite sheet having a carrier sheet with a front side and a back side, the carrier sheet being sandwiched between a top layer and a bottom layer:
    the top layer comprised of a mixture of: (a) polypropylene modifiers comprised of isotactic polypropylene, ethylene-propylene copolymer, atactic polypropylene and polyethylene, (b) filler, and (c) asphalt;
    the bottom layer comprised of self-adhesive compound comprised of a mixture of: (a) styrene-butadiene-styrene copolymer, (b) styrene-isoprene-styrene copolymer, (c) hydrocarbon tackifying resins, and (d) asphalt; and
    the top and bottom layers forming oppositely facing upper and lower surfaces.

2. A self-adhering underlayment as described in claim 1, wherein:
    the first top layer is comprised of a mixture of: (a) 5% to 25% polypropylene modifiers comprised of isotactic polypropylene, ethylene-propylene copolymer, atactic polypropylene and polyethylene, (b) 0% to 70% of filler, and (c) 45% to 77% asphalt; and the second bottom layer of self-adhesive compound is comprised of a mixture of: (a) 3% to 10% styrene-butadiene-styrene copolymer, (b) 4% to 11% styrene-isoprene-styrene copolymer, (c) 20% to 33% hydrocarbon tackifying resins, and (d) remainder asphalt.

3. A self-adhering underlayment as described in claim 2, wherein:
the hydrocarbon tackifying resins in the bottom layer compound is primarily Polyvinyl Butyral.

4. A self-adhering underlayment as described in claim 3, wherein:
the top layer has a surface feature selected from the group consisting of:
(a) a stitch-bonded fabric carried by said top layer,
(b) granules carried by said top layer, and
(c) a film applied to said top surface, said film having an anti-skid upper surface.

5. A self-adhering underlayment as described in claim 1, wherein:
said filler is selected from the group consisting of: limestone, talc, fly ash, volcanic ash, graphite, carbon black, silica, china clay, fire retardants and combinations thereof.

6. A self-adhering underlayment for tile roofing assemblies comprising:
a dual-compound composite sheet having a carrier sheet with a front side and a back side, the carrier sheet being sandwiched between a top layer and a bottom layer,
the top layer comprised of a mixture of: (a) polypropylene modifiers comprised of isotactic polypropylene, ethylene-propylene copolymer, atactic polypropylene and polyethylene, (b) filler, and (c) asphalt; said filler being selected from the group consisting of: limestone, talc, fly ash, volcanic ash, graphite, carbon black, silica, china clay, fire retardants and combinations thereof;
the top layer having a surface feature selected from the group consisting of:
a stitch-bonded fabric carried by said top layer, granules carried by said top layer, and a film applied to said top surface, said film having an anti-skid upper surface;
the bottom layer comprised of a self-adhesive compound comprised of a mixture of: (a) styrene-butadiene-styrene copolymer, (b) styrene-isoprene-styrene copolymer, (c) hydrocarbon tackifying resins that is primarily Polyvinyl Butyral, and (d) asphalt; and
the top and bottom layers forming oppositely facing upper and lower surfaces,
the first top layer is comprised of a mixture of: (a) 5% to 25% polypropylene modifiers comprised of isotactic polypropylene, ethylene-propylene copolymer, atactic polypropylene and polyethylene, (b) 0% to 70% of filler, and (c) 45% to 77% asphalt; and
the second bottom layer of self-adhesive compound is comprised of a mixture of: (a) 3% to 10% styrene-butadiene-styrene copolymer, (b) 4% to 11% styrene-isoprene-styrene copolymer, (c) 20% to 33% hydrocarbon tackifying resins, and (d) remainder asphalt;
the top layer compound is further comprised of fire retardant filler additives selected from the group consisting of calcium borate, magnesium borate, a mixture of antimony tri-oxide and deca bromo diphenyl oxide.

7. A self-adhering underlayment as described in claim 1, wherein:
the top layer compound contains a tackifying resin.

8. A self-adhering underlayment as described in claim 1, wherein:
a surfacing agent is at least partly imbedded in the upper surface of the composite.

9. A self-adhering underlayment as described in claim 8, wherein:
the surfacing agent is selected from the group consisting of stitch-bonded polypropylene fabric and a granular material.

10. A self-adhering underlayment as described in claim 1, wherein:
a release liner having a contact and non-contact surface is applied to the lower surface of the composite; and
the release liner is a polyester, polypropylene or polyethylene film having a siliconized contact surface and a white color non-contact surface.

11. A self-adhering underlayment for tile roofing assemblies comprising:
a dual-compound composite sheet having a carrier sheet with a front side and a back side, the carrier sheet being sandwiched between a top layer and a bottom layer:
the top layer comprised of a mixture of: (a) polypropylene modifiers comprised of isotactic polypropylene, ethylene-propylene copolymer, atactic polypropylene and polyethylene, (b) filler, and (c) asphalt;
the bottom layer comprised of self-adhesive compound comprised of a mixture of: (a) styrene-butadiene-styrene copolymer, (b) styrene-isoprene-styrene copolymer, (c) hydrocarbon tackifying resins, and (d) asphalt; and
the top and bottom layers forming oppositely facing upper and lower surfaces,
a side lap having a width of 3 inches to 4 inches running longitudinally along one lengthwise edge of the composite; and
an end lap having a width of 4 inches to 6 inches running widthwise along one end of the composite.

12. A self-adhering underlayment as described in claim 11, wherein:
a release film is applied to the side lap and end lap.

13. A self-adhering underlayment as described in claim 1, wherein:
a surfacing agent comprised of a granular material is at least partly imbedded in the upper surface of the composite in areas other than said side and end laps.

14. A self-adhering underlayment as described in claim 1, wherein:
said carrier is made of polyester.

15. A self-adhering underlayment as described in claim 1, wherein:
said carrier is made of fiberglass.

16. A self-adhering underlayment as described in claim 1, wherein:
said carrier is made of a material selected from the group consisting of polyester and fiberglass;
and a combination of polyester and fiberglass.

17. A self-adhering underlayment for tile roofing assemblies comprising:
a composite having a carrier sheet with a front side and a back side, the carrier sheet being sandwiched between a top layer and a bottom layer:
the top layer comprised of a mixture of: (a) polypropylene modifiers comprised of isotactic polypropylene, ethylene-propylene copolymer, atactic polypropylene and polyethylene, (b) filler, and (c) bitumen;
the bottom layer comprised of self-adhesive compound which is a mixture of: (a) styrene-butadiene-styrene copolymer, (b) styrene-isoprene-styrene copolymer, (c) hydrocarbon tackifying resins, (d) and asphalt; and the top and bottom layers forming oppositely upper and lower surfaces, said top layer having a surface feature selected from the group consisting of:
(a) a stitch-bonded fabric carried by said top layer,
(b) granules carried by said top layer, and
(c) a film applied to said top surface.

18. A self-adhering underlayment as described in claim 17, wherein: said granules extend over substantially the entire area of the upper surface of said top layer, except for a granule-free side lap and a granule-free end lap.

19. A self-adhering underlayment as described in claim 17, wherein:
the hydrocarbon tackifying resins in the bottom layer compound is primarily Polyvinyl Butyral.

20. A self-adhering underlayment as described in claim 19, wherein:
the first top layer is comprised of a mixture of: (a) 5% to 25% polypropylene modifiers comprised of isotactic polypropylene, ethylene-propylene copolymer, atactic polypropylene and polyethylene, (b) 0% to 70% of filler, and (c) 45% to 77% asphalt; and
the second bottom layer of self-adhesive compound is comprised of a mixture of: (a) 3% to 10% styrene-butadiene-styrene copolymer, (b) 4% to 11% styrene-isoprene-styrene copolymer, (c) 20% to 33% hydrocarbon tackifying resins, and (d) remainder asphalt.

21. A self-adhering underlayment for tile roofing assemblies comprising:
a composite having a carrier sheet with a front side and a back side, the carrier sheet being sandwiched between a top layer and a bottom layer:
the top layer comprised of a mixture of: (a) polypropylene modifiers comprised of isotactic polypropylene, ethylene-propylene copolymer, atactic polypropylene and polyethylene, (b) filler, and (c) bitumen;
said filler being selected from the group consisting of: limestone, talc, fly ash, volcanic ash, graphite, carbon black, silica, china clay, fire retardants and combinations thereof;
the bottom layer comprised of self-adhesive compound which is a mixture of: (a) styrene-butadiene-styrene copolymer, (b) styrene-isoprene-styrene copolymer, (c) hydrocarbon tackifying resins (d) and asphalt; and
the top and bottom layers forming oppositely upper and lower surfaces,
said top layer having a surface feature selected from the group consisting of:
(a) a stitch-bonded fabric carried by said top layer,
(b) granules carried by said top layer, and
(c) a film applied to said top surface;
the top layer compound further contains a fire retardant filler additive selected from the group consisting of calcium borate, magnesium borate, a mixture of antimony tri-oxide and deca bromo diphenyl oxide.

22. A self-adhering underlayment as described in claim 17, wherein:
the top layer compound further contains a tackifying resin.

23. A self-adhering underlayment as described in claim 17, wherein:
a surfacing agent is at least partly imbedded in the upper surface of the composite.

24. A self-adhering underlayment as describe in claim 23 wherein:
the surfacing agent is a granular material.

25. A self-adhering underlayment as described in claim 17, wherein:
a release liner having a contact and non-contact surface is applied to the lower surface of the composite; and
the release liner is a polyester, polypropylene or polyethylene film having a siliconized contact surface and a white color non-contact surface.

26. A self-adhering underlayment for tile roofing assemblies comprising:
a composite having a carrier sheet with a front side and a back side, the carrier sheet being sandwiched between a top layer and a bottom layer, the top layer comprised of a mixture of polypropylene modifiers comprised of:
(a) isotactic polypropylene, ethylene-propylene copolymer, atactic polypropylene and polyethylene, (b) filler, and (c) bitumen;
the bottom layer comprised of self-adhesive compound which is a mixture of: (a) styrene-butadiene-styrene copolymer, (b) styrene-isoprene-styrene copolymer, (c) hydrocarbon tackifying resins, (d) and asphalt; and
the top and bottom layers forming oppositely upper and lower surfaces,
said top layer having a surface feature selected from the group consisting of:
(a) a stitch-bonded fabric carried by said top layer,
(b) granules carried by said top layer, and
(c) a film applied to said top surface;
said top layer has a side lap having a width of 3 inches to 4 inches runs longitudinally along one lengthwise edge of the composite, said side lap being free of any surface agent carried by said top layer; and
said top layer has a granule-free an end lap having a width of 4 inches to 6 inches runs widthwise along one end of the composite, said end lap being free of any surface agent carried by said top layer.

27. A self-adhering underlayment as described in claim 26 wherein:
a release film is applied to the side lap and end lap.

28. A self-adhering underlayment as described in claim 17, wherein:
a surfacing agent comprised of a granular material is at least partly imbedded in the upper surface of the composite in areas other than said side and end laps.

29. A self-adhering underlayment as described in claim 17, wherein:
said carrier is made of polyester.

30. A self-adhering underlayment as described in claim 17, wherein:
said carrier is made of fiberglass.

31. A self-adhering underlayment as described in claim 17, wherein:
said carrier is made of a material selected from the group consisting of polyester and fiberglass and a combination of polyester and fiberglass.

32. A self-adhering underlayment for tile roofing assemblies comprising:
a dual-compound composite sheet having a carrier sheet with a front side and a back side, the carrier sheet being sandwiched between a top layer and a bottom layer;
the top layer comprised of a mixture of: (a) polypropylene modifiers comprised of isotactic polypropylene, ethylene-propylene copolymer, atactic polypropylene and polyethylene, (b) filler, and (c) asphalt;
the bottom layer comprised of self-adhesive compound comprised of a mixture of: (a) styrene-butadiene-styrene copolymer, (b) styrene-isoprene-styrene copolymer, (c) hydrocarbon tackifying resins, and (d) asphalt; and said filler being comprised of a material selected from the group consisting of: limestone, talc, fly ash, volcanic ash, graphite, carbon black, silica, china clay, fire retardants and combinations thereof, said top layer having a surfacing agent at least partly imbedded in the upper surface of the composite, a release liner applied to the lower surface of the composite, a side lap running longitudinally along one lengthwise edge of the top layer of the composite; and an end lap runs widthwise along one end of the composite;

a release film is applied to the side lap and end lap, and said a surfacing agent being partly imbedded in the upper surface of the composite in areas other than said side and end laps;

said carrier being made of a material selected from the group consisting of polyester and fiberglass and a combination of polyester and fiberglass.

33. A self-adhering underlayment as described in claim 32, wherein:

the top layer compound further being comprised of at least one fire retardant filler additives selected from the group consisting of calcium borate, magnesium borate, a mixture of antimony tri-oxide and deca bromo diphenyl oxide.

34. A self-adhering underlayment as described in claim 32, wherein:

the top layer compound is further comprised of tackifying resins.

35. A self-adhering underlayment as described in claim 32, wherein:

the top layer compound is further comprised of 0% to 2% tackifying resin.

36. A self-adhering underlayment as described in claim 32, wherein: the release liner is a polyester, polypropylene or polyethylene film having a siliconized contact surface and a white color non-contact surface.

37. A self-adhering underlayment as described in claim 32, wherein: the surfacing agent is selected from the group consisting of stitch-bonded polypropylene fabric and a granular material.

* * * * *